United States Patent
Faure (10) Patent No.: US 11,499,761 B2
(45) Date of Patent: Nov. 15, 2022

(54) THERMOCHEMICAL HEAT PUMP AND METHOD FOR REDISTRIBUTING HEAT ENERGY WITH VARIABLE POWER

(71) Applicant: Jean-Emmanuel Faure, Toulouse (FR)

(72) Inventor: Jean-Emmanuel Faure, Toulouse (FR)

(*) Notice: Subject to any disclaimer, the term of this patent is extended or adjusted under 35 U.S.C. 154(b) by 102 days.

(21) Appl. No.: 16/769,574

(22) PCT Filed: Dec. 3, 2018

(86) PCT No.: PCT/FR2018/053076
§ 371 (c)(1),
(2) Date: Jun. 3, 2020

(87) PCT Pub. No.: WO2019/110897
PCT Pub. Date: Jun. 13, 2019

(65) Prior Publication Data
US 2021/0164702 A1    Jun. 3, 2021

(30) Foreign Application Priority Data
Dec. 4, 2017   (FR) ...................................... 17 61608

(51) Int. Cl.
F25B 15/06   (2006.01)
F25B 17/08   (2006.01)
F25B 30/04   (2006.01)

(52) U.S. Cl.
CPC .............. *F25B 15/06* (2013.01); *F25B 17/08* (2013.01); *F25B 30/04* (2013.01); *F25B 2315/001* (2013.01)

(58) Field of Classification Search
CPC .......... F25B 15/06; F25B 17/08; F25B 30/04; F25B 2315/001
See application file for complete search history.

(56) References Cited

U.S. PATENT DOCUMENTS 2,452,635 A * 11/1948 Coons .................... F25B 17/083
                                                    62/106

FOREIGN PATENT DOCUMENTS

| FR | 1367790 | 7/1964 |
|---|---|---|
| FR | 2679632 | 1/1993 |

OTHER PUBLICATIONS

International Search Report dated Mar. 22, 2019.

* cited by examiner

*Primary Examiner* — Larry L Furdge
*Assistant Examiner* — Chang H Park
(74) *Attorney, Agent, or Firm* — Ipsilon USA, LLP (57) ABSTRACT

A thermochemical heat pump has a solvent evaporator (26), an evaporator exchanger (49) thermally associated with a hot source (27), a reactor having a solvent vapour inlet, at least one source of a saline composition containing at least one salt that is soluble in the solvent, and at least one cooling exchanger (81) thermally associated with a cold source. The reaction device (29) has at least one condensation reactor (52) with a solution inlet connected to the cooling exchanger, a solution outlet connected to the cooling exchanger, at least one injection of saline composition between the outlet and the inlet of the condensation reactor (52), and a valve for adjusting the mass flow of each salt introduced into the liquid solution by this injection.

15 Claims, 3 Drawing Sheets

THERMOCHEMICAL HEAT PUMP AND METHOD FOR REDISTRIBUTING HEAT ENERGY WITH VARIABLE POWER

RELATED APPLICATION

This application is a National Phase of PCT/FR2018/053076 filed on Dec. 3, 2018 which claims priority to FR 17 61608, filed on Dec. 4, 2018, the entirety of which are incorporated by reference.

The invention relates to a thermochemical heat pump, notably for redistributing thermochemically stored heat energy. The invention in particular covers a process for redistributing heat energy performed in such a thermochemical heat pump.

DESCRIPTION OF THE RELATED ART

The thermochemical recovery and storage of heat energy is of major interest and has been the subject of a great number of studies and proposals, for example for exploiting the heat, named free heat, which is necessarily produced but lost on industrial sites and heat production sites for urban heating networks, or for the off-season use of thermal solar energy (cf. for example the thesis "*Étude du stockage a long terme de l'energie solaire thermique par procede d'absorption LiBr-H$_2$O pour le chauffage de l'habitat* [Study of the long-term storage of thermal solar energy via the process of LiBr—H$_2$O absorption for domestic heating]", N'Tsoukpoe, University of Grenoble, 19 Mar. 2012).

A known thermochemical heat pump typically comprises a volatile solvent evaporator comprising a heat exchanger, named evaporator exchanger, thermally associated with a hot source, and a reaction device suitable for bringing about condensation of the volatile solvent vapour and absorption of a saline composition of at least one salt by the volatile liquid solvent thus formed by condensation so as to form a liquid solution, named primary solution, with production of heat evacuated to a cold source by a heat exchanger thermally associated with a cold source. Such a thermochemical heat pump enables absorption of the heat from the hot source (notably to cool it) and/or delivery of the heat to the cold source (notably to heat it). It may thus serve either for heating premises or a fluid or for cooling premises or a fluid.

As indicated in the abovementioned thesis, the choice of each salt of the saline composition and of the liquid solvent are particularly difficult and complex. In addition, one of the problems which arises with such a heat pump is that of enabling its correct adaptation to the needs of the use, this being either for its use for heating the cold source or for its use for cooling the hot source. In particular, the thermochemical heat pump must be efficient enough to afford the required heating or cooling, but must also be able to vary the heat power delivered as a function of the needs of the use.

OBJECTS AND SUMMARY

The invention is directed towards solving this general problem.

To do this, it relates to a thermochemical heat pump comprising:
an evaporator, named solvent evaporator, comprising:
  a tank of volatile liquid solvent,
  a heat exchanger, named evaporator exchanger, suitable for being thermally associated with a heat source, named hot source, said evaporator exchanger comprising a circuit having a volatile liquid solvent inlet connected to the volatile liquid solvent tank,
  a volatile solvent vapour outlet, said solvent evaporator being suitable for delivering a vapour of the volatile solvent vaporized under the effect of heat coming from said hot source,
a reaction device comprising:
  a volatile solvent vapour inlet,
  at least one source of a composition, named saline composition, containing at least one salt that is soluble in said volatile liquid solvent,
  at least one heat exchanger, named cooling exchanger, suitable for being thermally associated with a heat source, named cold source,
said vapour outlet from the solvent evaporator being connected to said vapour inlet of the reaction device,
the reaction device being suitable for bringing about condensation of said volatile solvent vapour and absorption of said saline composition to form a liquid solution, with production of heat evacuated to the cold source via said cooling exchanger,
characterized in that said reaction device comprises:
at least one reactor, named condensation reactor, comprising:
  a liquid solution inlet connected to a cold liquid solution outlet of said cooling exchanger,
  a volatile solvent vapour inlet,
  a liquid solution outlet connected to a hot liquid solution inlet of said cooling exchanger,
  this condensation reactor being suitable for enabling contact of the vapour fed by said vapour inlet with the cold liquid solution delivered to said liquid solution inlet, so as to bring about condensation of said vapour and mixing of the volatile liquid solvent thus formed by condensation with said cold liquid solution, the hot liquid solution delivered to the liquid solution outlet of the condensation reactor resulting from this mixing,
at least one injection of saline composition between said liquid solution outlet and said liquid solution inlet of at least one—notably of each—condensation reactor,
a device for adjusting the mass flow of each salt introduced into the liquid solution by means of at least one injection of saline composition between said liquid solution outlet and said liquid solution inlet of at least one condensation reactor.

The use of such a condensation reactor with recirculation of liquid solution with injection of saline composition and adjustment of the mass flow of each salt introduced by means of this injection enables simple adjustment of the operating concentration of the liquid solution formed by the reaction device. Now, the inventor has determined that this concentration imposes the theoretical temperature differential between the evaporation temperature of the solvent and the temperature of the hot liquid solution at the condensation reactor outlet, this theoretical temperature differential being a factor which has an influence on the heat power delivered by the heat pump. More particularly, the theoretical temperature differential that may be obtained between the solvent evaporator and the condensation reactor depends in particular on the choice of the liquid solvent, on each salt of the saline composition, and on this operating concentration.

In particular, the maximum theoretical temperature differential is itself determined by the maximum possible concentration of the liquid solution, which depends on the choice of each salt of the saline composition and on the liquid solvent. In a thermochemical heat pump according to the invention, it thus suffices to choose the saline composition and the liquid solvent to obtain a maximum concentration determining a maximum theoretical temperature differential that is sufficient for the maximum heat power needs of the use. Within this maximum range, the heat power delivered by the heat pump according to the invention may be adjusted simply in operation by adjusting the mass flow of each salt resulting from an injection of saline composition between the outlet and the inlet of at least one condensation reactor.

A heat pump according to the invention may include a single cooling exchanger thermally associated with a single cold source, or several heat exchangers thermally associated with several different cold sources.

A heat pump according to the invention may include a single condensation reactor, or a plurality of different condensation reactors, for example arranged in parallel or in cascade.

A heat pump according to the invention may include a single injection of saline composition between the outlet and the inlet of each condensation reactor, or a plurality of different injections of the same saline composition or of different saline compositions between the outlet and the inlet of each condensation reactor.

A thermochemical heat pump according to the invention may include a single source of saline composition, or a plurality of different sources of the same saline composition, or else a plurality of different sources of a plurality of different saline compositions (the various saline compositions differing from each other in the nature of at least one salt and/or the proportion thereof).

Any embodiment of source of saline composition may be envisaged in a heat pump according to the invention. That being said, in certain advantageous embodiments, a thermochemical heat pump according to the invention comprises, as a source of saline composition, at least one solubilization reactor suitable for enabling the solubilization of at least one, notably of each, solid salt of said saline composition in an unsaturated liquid solution of said liquid solvent, this solubilization reactor comprising at least one outlet delivering a flow of concentrated liquid solution forming said saline composition. Thus, in these embodiments, the saline composition is formed within the heat pump itself according to the invention from at least one solid salt. A heat pump according to the invention may include a single solubilization reactor, notably when the saline composition includes a single salt; or several solubilization reactors, for example to solubilize several different salts and/or in different concentrations and/or using different unsaturated liquid solutions.

The use of such a solubilization reactor is particularly advantageous in the case where the thermochemical heat pump according to the invention is used for redistributing heat energy that has been recovered thermochemically beforehand by dissociation of a liquid solution of at least one salt in the form of a solid composition of at least one salt and of the volatile liquid solvent. Specifically, it then suffices to place the solid composition in a solubilization reactor and the liquid solvent in the solvent evaporator to redistribute to the cold source and/or to the hot source the heat energy thus stored in thermochemical form.

In certain advantageous embodiments of a heat pump according to the invention, at least one, notably each, solubilization reactor is suitable for delivering the saline composition in the form of a saturated liquid solution.

In addition, in certain advantageous embodiments in accordance with the invention, at least one injection of saline composition is connected, notably via a pipe, to at least one outlet of a condensation reactor. More particularly, in certain particular embodiments, said injection of saline composition is formed by an injection pipe connecting at least one outlet of a solubilization reactor to a pipe, named common pipe, connected to said liquid solution outlet of a condensation reactor. As a variant or in combination, there is nothing to prevent an injection of saline composition upstream of said liquid solution inlet of a condensation reactor from being provided.

A heat pump according to the invention advantageously includes at least one pump for driving the liquid solutions. In particular, in certain advantageous embodiments according to the invention, said common pipe comprises a pump downstream of said injection of saline composition. This pump thus makes it possible to drive the mixture formed in said common pipe by the saline composition coming from the solubilization reactor with the liquid solution coming from the condensation reactor.

In certain particularly advantageous embodiments of a thermochemical heat pump according to the invention, at least one, notably each, solubilization reactor comprises an unsaturated liquid solution inlet connected via a feed pipe to said common pipe, said feed pipe comprising a controlled valve for adjusting the flow of unsaturated liquid solution delivered to this inlet of the solubilization reactor. Thus, the saline composition is formed from a concentrated liquid solution obtained by dissolving at least one solid salt in a fraction of the flow of dilute liquid solution collected at the outlet of a condensation reactor. In addition, preferably, the feed pipe of the solubilization reactor is connected to the common pipe downstream of said pump. Thus, this pump also makes it possible to feed the solubilization reactor, which makes it possible to avoid multiplying such pumps, the cost of which is relatively high given the corrosive properties of the saline solutions. Advantageously and according to the invention, said adjustment device is suitable for controlling each controlled valve of the feed pipe of a solubilization reactor, i.e. this adjustment of the mass flow of each salt introduced into the liquid solution between the outlet and the inlet of a condensation reactor is performed by adjusting the flow of unsaturated liquid solution fed to the inlet of a solubilization reactor.

The adjustment device of a heat pump according to the invention may be subject to any number of variants. It may in particular be a manual adjustment device, with or without computer assistance, or, on the other hand, preferably, an automatic adjustment device using at least one nominal value defined by the user. This adjustment device may thus in particular include at least one closed-loop or open-loop servo control, for example at least one proportional controller and/or one proportional-derivative controller and/or one proportional-integral controller and/or one proportional-integral-derivative (PID) controller or the like.

In particular, in certain advantageous embodiments of a thermochemical heat pump according to the invention, the adjustment device comprises at least one servo control that is suitable for delivering a control signal as a function of at least one temperature value measured in the thermochemical heat pump.

In certain advantageous embodiments, a thermochemical heat pump according to the invention comprises a temperature sensor for said cold liquid solution at the outlet of each cooling exchanger, and the adjustment device is suitable for locking the flow delivered by the controlled valve of the feed pipe of at least one solubilization reactor as a function of the temperature of said cold liquid solution measured by at least one such temperature sensor. Thus, the adjustment of the mass flow of salt introduced which enables adjustment of the operating concentration may be performed without measurement or knowledge of the real value of this operating concentration, solely by locking a flow delivered by a controlled valve of a feed pipe of at least one solubilization reactor (which determines the flow of saline composition injected from this solubilization reactor) on the temperature measured at the outlet of the cooling exchanger. Thus, if the temperature measured at the outlet of the cooling exchanger is too low, the servo control opens the controlled valve to increase the flow of saline composition introduced into the liquid solution. Conversely, if the temperature measured at the outlet of the cooling exchanger is too high, the servo control closes the controlled valve to decrease the flow of saline composition introduced into the liquid solution. Such a servo control on the controlled valve of a feed pipe of a solubilization reactor thus enables simple adjustment of the theoretical temperature differential of the heat pump according to the invention.

Moreover, in certain embodiments of a heat pump according to the invention, the common pipe is connected to the hot liquid solution inlet of each cooling exchanger via a recirculation pipe comprising a controlled valve for adjusting the flow of hot liquid solution delivered to this cooling exchanger, and thus the flow of cold liquid solution delivered to the inlet of each condensation reactor connected to the liquid solution outlet of this cooling exchanger. In addition, preferably, said recirculation pipe is connected to the common pipe downstream of said pump. Thus, this pump also makes it possible to feed each cooling exchanger, which makes it possible to avoid multiplying such pumps, the cost of which is relatively high given the corrosive properties of the saline solutions.

Such a controlled valve of a recirculation pipe thus enables adjustment of the overall flow of the liquid solution circulating through each condensation reactor, and thus the heat power delivered by the heat pump according to the invention. This adjustment may be made entirely manually or, on the contrary, by an automatism comprising at least one servo control on a nominal value defined by the user, for example by a thermostatic device of the hot source and/or of the cold source.

The invention applies to a thermochemical heat pump of any nature, the general operating conditions of which may be subject to numerous variants as a function of the applications and of the choice of the liquid solvent and of each salt of the saline composition. That being said, in certain embodiments in accordance with the invention, each evaporator, the reaction device, each pipe in which vapour circulates and each pipe in which a liquid solution circulates are at negative pressure under vacuum of intermediary gases. In particular, each evaporator, each condensation reactor, each pipe connecting an evaporator to a condensation reactor, each solubilization reactor and each other pipe in which a liquid solution circulates are at negative pressure under vacuum of intermediary gases. Such an implementation at negative pressure under vacuum of intermediary gases makes it possible in particular to perform the evaporation at low temperature.

As indicated above, a thermochemical heat pump according to the invention may be used with any volatile liquid solvent and any saline composition, according to the applications and the needs. That being said, in certain advantageous embodiments, said volatile liquid solvent is water and said saline composition comprises at least one salt chosen from the group formed from $ZnCl_2$, NaOH, LiBr, $ZnBr_2$, KOH, LiCl, $CaBr_2$, LiI, $CaCl_2$), $MgCl_2$, NaI, $Ca(NO_3)_2$, $Mg(NO_3)_2$, NaBr, $NH_4NO_3$, KI, $SrCl_2$, $NaNO_3$, NaCl, $KCH_3CO_2$, $K_2CO_3$, $MnCl_2$, $NaNO_2$.

In particular, the invention relates to a thermochemical heat pump comprising:
an evaporator, named solvent evaporator, comprising:
a tank of volatile liquid solvent,
a heat exchanger, named evaporator exchanger, suitable for being thermally associated with a heat source, named hot source, said evaporator exchanger comprising a circuit having a volatile liquid solvent inlet connected to the volatile liquid solvent tank,
a volatile solvent vapour outlet, said solvent evaporator being suitable for delivering a vapour of the volatile solvent vaporized under the effect of heat coming from said hot source,
a heat exchanger, named cooling exchanger, suitable for being thermally associated with a heat source, named cold source,
a condensation reactor comprising:
a liquid solution inlet connected to a cold liquid solution outlet of said cooling exchanger,
a volatile solvent vapour inlet,
a liquid solution outlet connected to a hot liquid solution inlet of said cooling exchanger,
a pipe connecting said vapour outlet of the solvent evaporator to said vapour inlet of the condensation reactor,
the condensation reactor being suitable for enabling contact of the vapour fed by said vapour inlet with the cold liquid solution delivered to said liquid solution inlet of the condensation reactor, so as to bring about condensation of said vapour and mixing of the volatile liquid solvent thus formed by condensation with said cold liquid solution, the hot liquid solution delivered to the liquid solution outlet of the condensation reactor resulting from this mixing,
at least one source of a composition, named saline composition, containing at least one salt that is soluble in said volatile liquid solvent,
at least one injection of saline composition between said liquid solution outlet and said liquid solution inlet of the condensation reactor,
a device for adjusting the mass flow of saline composition injected between said liquid solution outlet and said liquid solution inlet of the condensation reactor.

The invention also covers a process performed in a thermochemical heat pump according to the invention.

It thus relates to a process for redistributing thermochemically stored heat energy, comprising:
an evaporation of a volatile liquid solvent, by heat exchange with a heat source, named hot source,
a reaction comprising condensation of said volatile solvent vapour and absorption of a saline composition to form a liquid solution, with production of heat evacuated by heat exchange towards a heat source, named cold source,
characterized in that the reaction is performed in at least one reactor, named condensation reactor, and comprises:
feeding a liquid solution inlet of the condensation reactor with a cold liquid solution coming from a cooling exchanger suitable for being thermally associated with said cold source,
feeding the condensation reactor with a volatile solvent vapour resulting from said evaporation,
feeding said cooling exchanger with a hot liquid solution delivered by a liquid solution outlet of the condensation reactor, contacting the vapour fed into the condensation reactor with the cold liquid solution fed into the condensation reactor, so as to bring about condensation of said vapour and mixing of the volatile liquid solvent thus formed by condensation with said cold liquid solution, the hot liquid solution delivered by the condensation reactor resulting from this mixing, injecting at least one saline composition between said liquid solution outlet and said liquid solution inlet of at least one—notably of each—condensation reactor, adjusting the mass flow of each salt introduced into the liquid solution by injection of saline composition between said liquid solution outlet and said liquid solution inlet of at least one—notably of each—condensation reactor.

In particular, in certain embodiments of a process according to the invention, said adjustment comprises locking the mass flow on at least one measured temperature, notably a measured temperature of the cold liquid solution fed into the condensation reactor.

In addition, in certain embodiments of a process according to the invention, said saline composition is formed by solubilization of at least one solid salt in a fraction of the flow of liquid solution comprising the liquid solution delivered by at least one—notably by each—condensation reactor. The saline composition is then a concentrated liquid solution, notably at saturation.

In certain embodiments of a process according to the invention, said adjustment then comprises servo control of the injected flow of saline composition. As a variant or in combination, there is nothing to prevent the adjustment from being performed by servo control of the concentration of the injected saline composition.

The invention also relates to a thermochemical heat pump that is suitable for performing a heat energy redistribution process according to the invention.

The invention also relates to a thermochemical heat pump and a process for redistributing heat energy, characterized, in combination or otherwise, by all or some of the structural or functional features mentioned hereinabove or hereinbelow. Irrespective of the formal presentation that is given thereof, unless explicitly indicated otherwise, the various structural or functional features mentioned hereinabove or hereinbelow should not be considered as being strictly or inextricably linked together, the invention possibly concerning only one of these features, or only a part of one of these features, or else any group, combination or juxtaposition of all or some of these features.

BRIEF DESCRIPTION OF THE DRAWINGS

Other aims, features and advantages of the invention will emerge on reading the following non-limiting description which refers to the attached figures in which.

DETAILED DESCRIPTION

Figure 1:
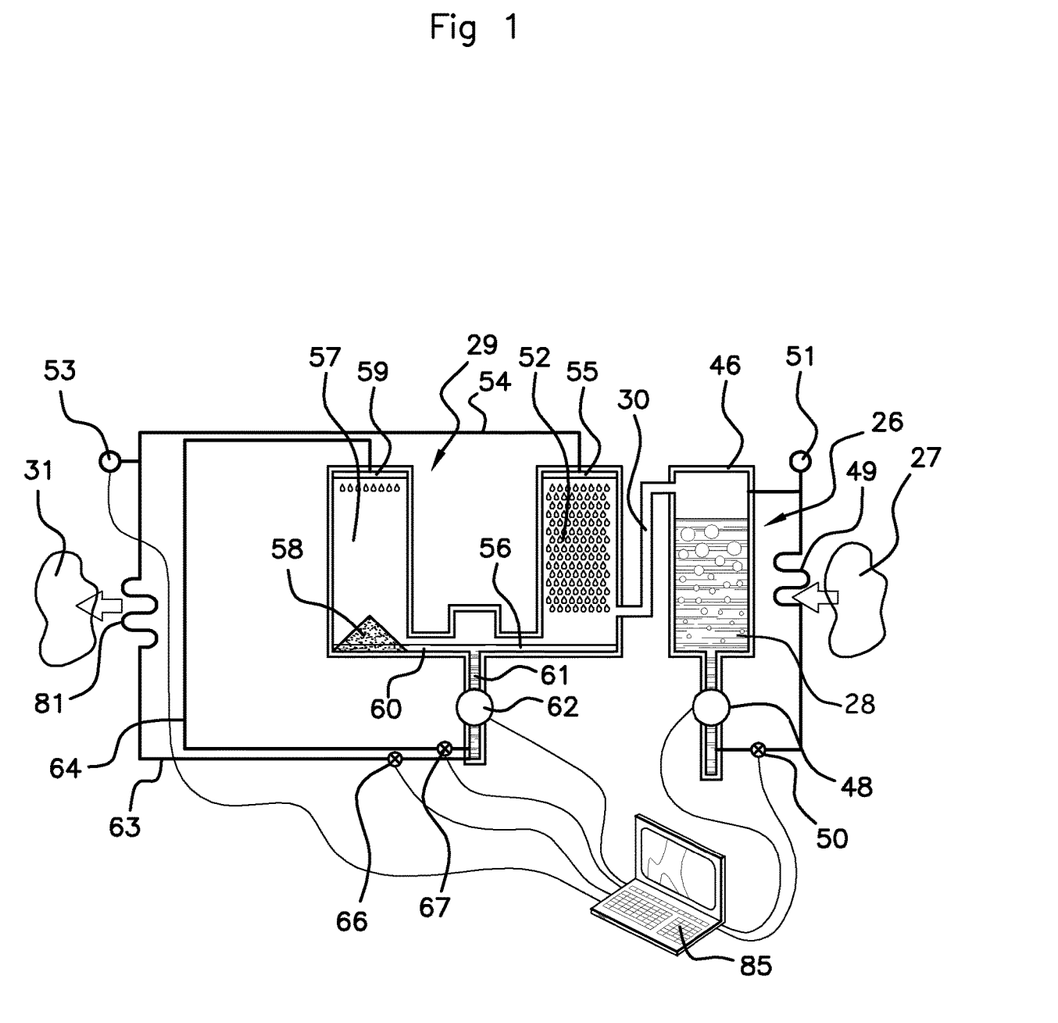
FIG. 1 is a scheme representing a first possible embodiment of a thermochemical heat pump according to the invention.

The thermochemical heat pump 15 according to the invention represented in FIG. 1 comprises:

an evaporator, named solvent evaporator 26, at negative pressure under vacuum of intermediary gases into which a pure liquid solvent 28 (for example supplied by a vehicle coming from a recovery site) is fed, this solvent evaporator 26 being thermally associated with a cold medium 27 acting as a hot source so as to enable absorption, by the solvent evaporator 26, of heat drawn from this hot source 27 enabling the evaporation of the liquid solvent 28 in the solvent evaporator 26;

a reaction device 29 at negative pressure under vacuum of intermediary gases connected to the outlet of the solvent evaporator 26 via a pipe 30 at negative pressure under vacuum of intermediary gases so as to receive the vapour produced by the solvent evaporator 26; this reaction device 29 is fed with an amount of solid composition of at least one salt (for example supplied by the vehicle coming from the recovery site simultaneously with the pure liquid solvent); the reaction device 29 is suitable for enabling, on the one hand, the condensation of the liquid solvent, and its placing in contact with at least part of said amount of solid composition and also the dissolution of each salt in the liquid solvent of an unsaturated liquid solution to form a liquid solution at a total concentration Cf.

The reaction device 29 is thermally associated with a hot medium 31 acting as a cold source so as to enable heat transfer to this cold source under the effect of the production of heat resulting, on the one hand, from the condensation of the vapour, and, on the other hand, from the dissolution of the solid composition in the liquid solvent.

Such a heat pump 15 thus enables cooling of the hot source 27 and/or heating of the cold source 31 due to the formation of the solution by dissolution of said solid composition of at least one salt in the liquid forming the solvent for this solid composition.

The solvent evaporator 26 comprises a closed tank 46 containing the pure liquid solvent to be evaporated, the bottom of which is in communication with a pipe 47 equipped with a pump 48 and a controlled optional rate valve 50 enabling extraction of the liquid from the tank 46 to pass it into a heat exchanger, named evaporator exchanger 49, associated with the hot source 27, which is at a temperature above that of the pure liquid solvent extracted from the tank 46. Consequently, the liquid solvent vaporizes at least partially in the solvent evaporator 26 under the effect of the heat absorbed by the evaporator exchanger 49, the outlet of which is connected to the top part of the tank 46, above the level of the liquid solvent in the tank 46, this top part of the tank 46 receiving the solvent thus vaporized. A temperature sensor 51 enables measurement of the temperature of the vapour of the liquid solvent at the outlet of the evaporator exchanger 49.

The reaction device 29 comprises a condensation reactor 52 in the form of a closed chamber connected to the top part of the tank 46 of the solvent evaporator 26 via the pipe 30 so as to be able to be fed with the solvent vapour from the evaporator 26. The top part of the condensation reactor 52 comprises a trickle device 55 connected to a pipe 54 for feeding liquid solution. This trickle device 55 enables the creation of a falling film of the liquid solution inside the condensation reactor 52, on contact with the solvent vapour, thus bringing about condensation of this vapour and its mixing with the liquid solution, with production of heat. In the bottom part of the condensation reactor 52, the liquid solution is thus at a lower concentration and at a higher temperature than the liquid solution at the inlet of the condensation reactor 52. The liquid solution is extracted from the reactor 52 via a pipe 56.

The reaction device 29 also includes a solubilization reactor 57 which is also in the form of a closed chamber and is suitable for being fed with crystals of at least one solid salt 58, for example placed on a horizontal screen and/or in a textile matrix. This solubilization reactor 57 also comprises in the top part a feed 59 of liquid solution enabling the flow of this liquid solution on contact with the solid salt crystals 58, and the solubilization of these crystals in the liquid solution. After solubilization and production of heat, the concentrated liquid solution at saturation is extracted in the bottom part of the solubilization reactor 57 via a pipe 60.

The pipes 56 and 60 delivering the liquid solutions coming, respectively, from the condensation reactor 52 and the solubilization reactor 57 join together in a common pipe 61 in which the liquid solutions mix, at the inlet of a pump 62.

A first pipe 63 comprising a controlled optional rate valve 66 connects the outlet of the pump 62 to a heat exchanger, named cooling exchanger 81, associated with the cold source 31 enabling heat transfer from the liquid solution delivered by the pump 62 to the cold source 31, the outlet of this heat exchanger 81 delivering a cooled liquid solution. This cooled liquid solution is fed into the condensation reactor 52 via a pipe 54 which connects the outlet of the heat exchanger 81 to the condensation reactor 52. A temperature sensor 53 enables measurement of the temperature of the liquid solution circulating in the pipe 54 between the exchanger 81 and the condensation reactor 52.

A second pipe 64 comprising a controlled optional rate valve 67 connects the outlet of the pump 62 to the feed 59 of the solubilization reactor 57.

Gradually as the solvent collected from the tank 46 of the solvent evaporator 26 evaporates, the reaction device 29 produces in the common pipe 61 a volume of liquid solution, named primary solution, at the total operating concentration Cf. This primary solution may be reused in a subsequent heat energy recovery phase, for example after transportation to a site for recovering free heat (heat necessarily produced at an industrial site and normally lost). This primary solution may be delivered in a storage tank (not shown in FIG. 1) fed as a function of its production from the common pipe 61. As a variant, it is possible to collect the liquid solution at the outlet of the condensation reactor 52 to store it in a storage tank for the purpose of its subsequent use.

An automatic machine, which, in the example represented, is a computer device 85, is connected to the temperature sensors 51, 53 to receive therefrom the measurement signals, and to the valves 66, 67 to be able to control them, this automatic machine 85 being programmed by servo control.

Control of the valve 67 enables adjustment of the mass flow of saline composition introduced into the liquid solution via the pipe 60 at the outlet of the solubilization reactor 57, and thus the total operating concentration Cf of the heat pump. This total concentration Cf determines the theoretical temperature differential afforded by the liquid solution.

Figure 2:
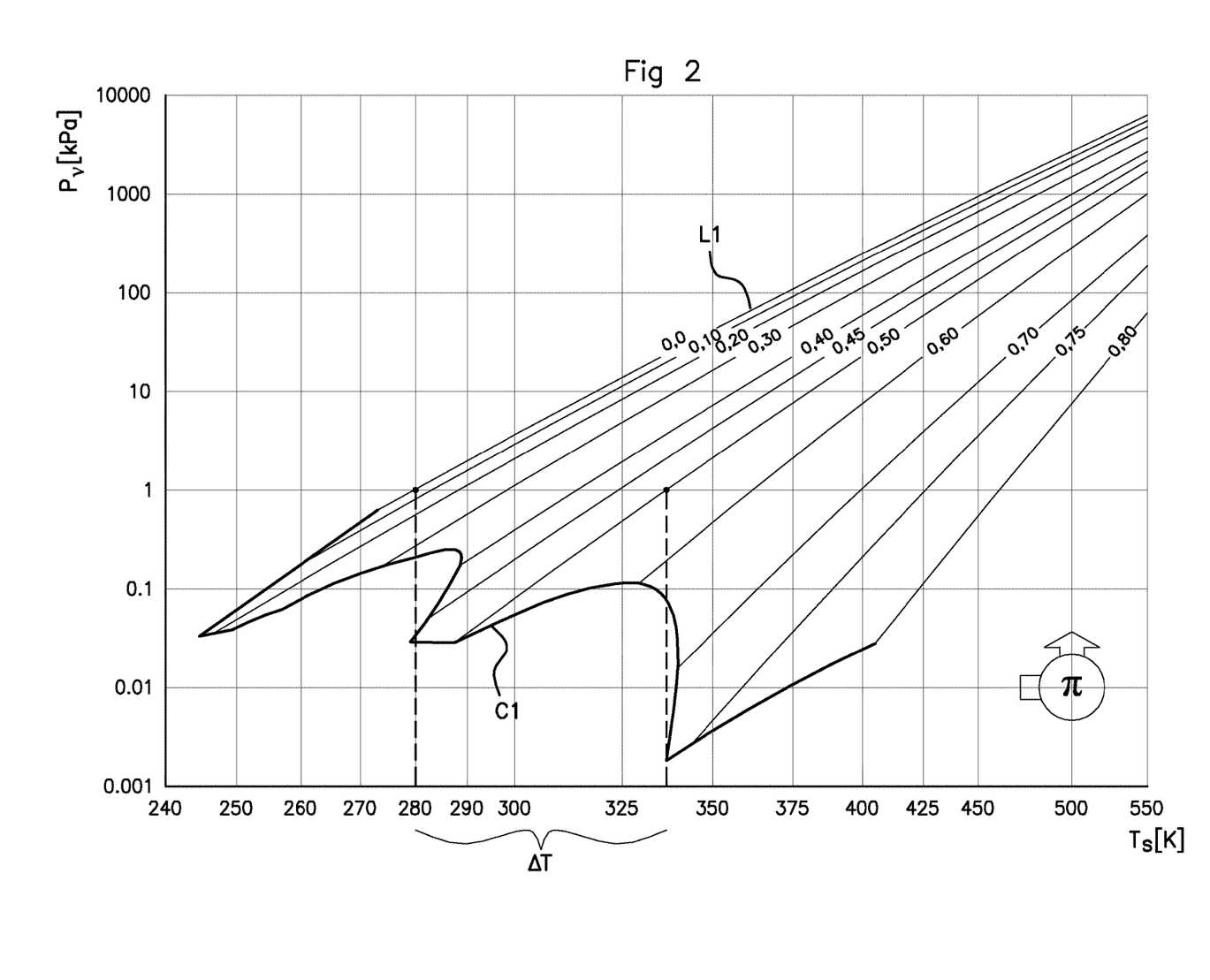
FIG. 2 is an Othmer diagram of the aqueous sodium hydroxide solutions.

FIG. 2 represents an Othmer diagram of the logarithm of the vapour pressure as a function of the temperature of the aqueous sodium hydroxide solutions. The curve Cl is the crystallization curve. The various lines which extend from this crystallization curve correspond to the various mass concentrations of the aqueous sodium hydroxide solutions, the line L1 that is the most to the left corresponding to pure water. As may be seen, for example, relative to pure water at 280 K (7° C.), the theoretical temperature differential ΔT presented by an aqueous 50% sodium hydroxide solution is 335 K−280 K=55 K. This theoretical temperature differential is 120 K for an aqueous 70% sodium hydroxide solution. Thus, with sodium hydroxide, it is possible to obtain a large theoretical temperature differential.

If the heat pump is used for heating the cold source 31 to a predetermined nominal temperature, the temperature of the hot source 27 and that of the solvent in the evaporator 26 are predetermined (or considered as such) and the value of the theoretical temperature differential determines the temperature of the liquid solution at the outlet of the condensation reactor 52, and thus the temperature of the liquid solution at the inlet of the cooling exchanger 81.

At a constant flow rate, by increasing this temperature of the liquid solution at the inlet of the cooling exchanger 81, the heat power supplied to the cold source 31 is increased. The temperature measured by the sensor 53 at the outlet of the cooling exchanger 81 is representative, to within one efficiency ratio of the cooling exchanger 81, of the temperature of the cold source 31. If this measured temperature is less than the nominal temperature, the automatic machine 85 increases the opening of the valve 67 to increase the mass flow of saline composition injected, thus increasing the temperature of the liquid solution at the inlet of the cooling exchanger 81. If, on the other hand, the measured temperature is higher than the nominal temperature, the automatic machine 85 decreases the opening of the valve 67 to decrease the mass flow of saline composition injected, thus decreasing the temperature of the liquid solution at the inlet of the cooling exchanger 81.

The control law used for increasing or decreasing the opening of the valve 67 as a function of the difference between the temperature measured by the sensor 53 and the nominal temperature may be subject to any number of appropriate variants: it may in particular be a proportional and/or proportional-derivative and/or proportional-integral and/or proportional-integral-derivative (PID) control law or the like.

It should be noted that since the cooling exchanger 81 comprises a secondary circuit thermally associated with the cold source 31 isolated from the main circuit of this exchanger 81 forming part of the heat pump, the temperature sensor 53 can be replaced with a temperature sensor at the outlet of this secondary circuit so as to afford a finer adjustment with respect to the nominal temperature of the cold source 31.

It should moreover be noted that the temperature of the liquid solution at the inlet of the cooling exchanger 81 must be higher than the nominal temperature to which the cold source 31 must be brought. In this respect, the saline composition should thus be chosen so that this condition can be complied with. In particular, the use of sodium hydroxide makes it possible in practice to satisfy this condition by simply locking on the temperature measured by the sensor 53, since, as indicated above, the theoretical temperature differential that can be obtained with sodium hydroxide may be very high and may be up to 150° C.

Controlling the valve 66 enables adjustment of the flow of liquid solution recirculating in the condensation reactor 52. Preferably, under normal operating conditions, the valve 66 is fully open. However, if the required power decreases, it is possible to close the valve 66 to instantly decrease the heat power supplied by the heat pump.

The automatic machine is also connected to the pumps 62, 48 and programmed to control the switching on or stoppage thereof, and to the valve 50 for adjusting the flow of evaporated liquid solvent in the evaporator 26.

If the heat pump is used for cooling the hot source 27 to a predetermined nominal temperature, the temperature of the cold source 31 and that of the liquid solution at the outlet of the condensation reactor 52 are predetermined (or considered as such) and the value of the theoretical temperature differential determines the temperature of the liquid solvent in the evaporator 26 at the inlet of the evaporator exchanger 49.

At a constant flow rate, by decreasing this temperature of the liquid solvent at the inlet of the evaporator exchanger 49, the heat power supplied by the hot source 27 to the evaporator exchanger 49 is increased. If the temperature of the vapour at the outlet of the evaporator exchanger 49, measured by the sensor 51, is lower than the nominal temperature, the automatic machine 85 decreases the opening of the valve 67 to decrease the mass flow of saline composition injected, and thus to increase the temperature of the liquid solvent at the inlet of the evaporator exchanger 49. If, on the other hand, the temperature measured by the sensor 51 is higher than the nominal temperature, the automatic machine 85 increases the opening of the valve 67 to increase the mass flow of saline composition injected, and thus to decrease the temperature of the liquid solvent at the inlet of the evaporator exchanger 49.

The control law used for increasing or decreasing the opening of the valve 67 as a function of the difference between the temperature measured by the sensor 51 and the nominal temperature may be subject to any number of appropriate variants: it may in particular be a proportional and/or proportional-derivative and/or proportional-integral and/or proportional-integral-derivative (PID) control law or the like.

It should moreover be noted that the temperature of the liquid solvent at the inlet of the evaporator exchanger 49 must be lower than the nominal temperature to which the hot source 27 must be brought. In this respect, the saline composition should thus be chosen so that this condition can be complied with. In particular, the use of sodium hydroxide makes it possible in practice to satisfy this condition by simply locking on the temperature measured by the sensor 51, since, as indicated above, the theoretical temperature differential that can be obtained with sodium hydroxide may be very high and may be up to 150° C.

Controlling the valve 50 at the inlet of the evaporator exchanger 49 enables adjustment of the flow of liquid solvent circulating in this evaporator exchanger 49. Preferably, under normal operating conditions, the valve 50 is fully open. However, if the required power decreases, it is possible to close the valve 50 to instantly decrease the heat power supplied by the heat pump.

As indicated previously as regards the cold source 31, the temperature sensor 51 may be replaced or supplemented with a temperature sensor at the outlet of the secondary circuit of the evaporator exchanger 49 and/or with a temperature sensor for the hot source 27.

Figure 3:
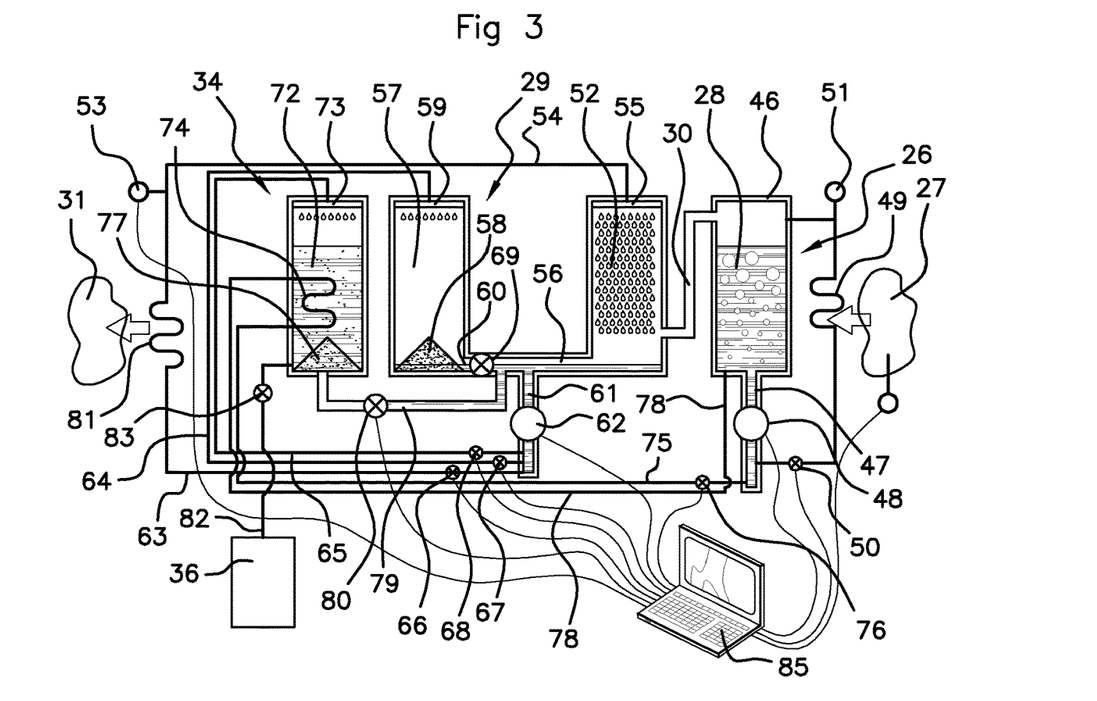
FIG. 3 is a scheme representing a second possible embodiment of a thermochemical heat pump according to the invention.
Figure 4:
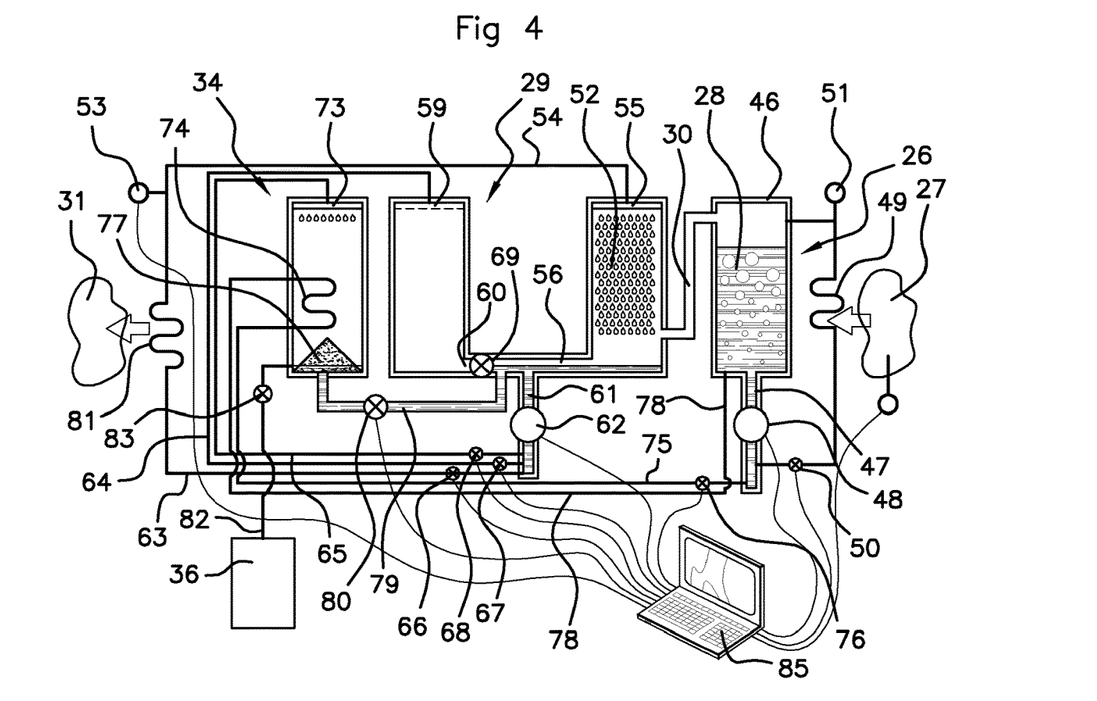
FIG. 4 is a scheme representing the heat pump of FIG. 3 in a different state.

In the embodiment represented in FIGS. 3 and 4, the primary solution delivered by the reaction device 29 is then subjected to a partial separation step during which it is partially deconcentrated. To do this, the primary solution is fed to the inlet of a recrystallization device 34 at negative pressure under vacuum of intermediary gases comprising a heat exchange device associated with the evaporator 26 so as to cool the primary solution by means of the cold produced by the evaporator 26 to a temperature that is low enough to bring about partial recrystallization of at least one salt contained in the primary solution.

The recrystallization device 34 produces, on the one hand, a liquid solution, named deconcentrated solution, having a non-zero total concentration Cd less than Cf, and which may be stored, for example, in a tank 36 at negative pressure under vacuum of intermediary gases; on the other hand, an amount of solid composition of at least one salt, named recrystallized composition 77.

The recrystallized composition 77 may be recycled into the reaction device 29 to form the primary solution.

As may be seen, the reaction device 29 functions with a total concentration Cf which is that of the primary solution 32 produced, which defines the maximum temperature difference that can be produced between the reaction device 29 and the evaporator 26, and thus between the hot source 27 and the cold source 31.

On the other hand, if the recrystallized composition 77 does not contain any solvent, the deconcentrated solution contains the same amount of liquid solvent as the primary solution but is at a concentration Cd less than Cf.

The reaction device 29 thus also comprises a partial recrystallization reactor 72, in the form of a closed chamber, which comprises a heat exchanger 74 comprising a cold circuit fed with cold liquid solvent via a pipe 75 connected downstream of the outlet pump 48 of the evaporator 26 via a controlled optional rate valve 76. After passing into this cold circuit in which it becomes heated, the liquid solvent is recycled into the tank 46 of the evaporator 26 via a pipe 78. The partial recrystallization reactor 72 also comprises in the top part a feed 73 of liquid solution enabling the flow of this liquid solution on contact with the heat exchanger 74 (or in the hot circuit thereof), whereby this liquid solution becomes cooled to a temperature that is low enough to partially recrystallize. The crystals 77 thus formed are recovered in the bottom part of the partial recrystallization reactor 72, for example on a screen or in a textile matrix thereof. The deconcentrated liquid solution thus formed in the partial recrystallization reactor 72 is extracted in the bottom part thereof via the pipe 82 comprising a controlled valve 83, this pipe 82 emerging in the tank 36 in which the deconcentrated liquid solution is stored.

A pipe 79 comprising a controlled optional rate valve 80 also connects the bottom part of the partial recrystallization reactor 72 to the downstream of the outlet valve 69 of the solubilization reactor 57 or to the common pipe 61 upstream of the pump 62, so that the liquid solution obtained from the partial recrystallization reactor 72 can be mixed with the liquid solution obtained from the condensation reactor 52. The pipe 60 connecting the solubilization reactor 57 to the common pipe 61 comprises a controlled optional rate valve 69. A third pipe 65 comprising a feed optional rate valve 68 connects the outlet of the pump 62 to the feed 73 of the partial recrystallization reactor 72.

The automatic machine 85 enables regulation of the crystallization temperature in the partial recrystallization reactor 72 by adjusting the flow of liquid solvent fed to the heat exchanger 74 by controlling the degree of opening of the valve 76 as a function of the temperature measured in the partial recrystallization reactor 72 by means of a temperature sensor (not shown), the signals of which are delivered to the automatic machine 85.

The automatic machine 85 also enables regulation of the level of liquid solution in the reaction device 29 as a function of the supply of liquid solvent obtained from the evaporator 26, by controlling the feed flow of the partial recrystallization reactor 72 by controlling the degree of opening of the feed valve 68. To do this, at least one level sensor (not shown) for the liquid solution in the reaction device 29 is advantageously provided, the automatic machine 85 receiving the signals delivered by each level sensor and being suitable for maintaining the level of liquid.

In the state represented in FIG. 3, the station enables the gradual solubilization of the crystals 58 which correspond, for example, to a composition supplied by vehicle, in the amount of pure liquid solvent corresponding, for example, to an amount supplied by vehicle, incorporated into the tank 46 of the evaporator 26. Evaporation of the liquid solvent in the evaporator 26 produces cold used in the exchanger 74 to partially recrystallize at least part of the liquid solution in the partial recrystallization reactor 72 which produces a deconcentrated solution which accumulates, and also the crystals 77 of at least one solid salt thus formed, in the partial recrystallization reactor 72. The volume of the liquid solution fed into the partial recrystallization reactor 72 advantageously corresponds, for example, to the volume of liquid solvent reintroduced by the condensation reactor 52 from the evaporator 26.

In this state, the valves 50, 66, 67, 68, 69, 76 are open and the valve 80 is closed. The liquid solution formed in the common pipe 61 is the primary solution which has a concentration Cf, the value of which depends on the respective state of the valves 66 and 67 enabling regulation of the flows delivered, respectively, to the condensation reactor 52 and to the solubilization reactor 57, and thus the heat power delivered, as a function of the demand of the hot source 27 and/or of the cold source 31.

Once all the crystals 58 have been solubilized in the solubilization reactor 57 and/or once the partial recrystallization reactor 52 has reached its maximum capacity of deconcentrated solution, this solution is evacuated into the tank 36 via the pipe 82 by opening the controlled valve 83.

In the state represented in FIG. 4, the common pipe 61 is fed not from the solubilization reactor 57, but from the partial recrystallization reactor 72 which then acts as a solubilization reactor. In this state, the valve 69 is closed and the valve 80 is open. The liquid solution formed in the common pipe 61 is the primary solution, the concentration Cf of which depends on the respective state of the valves 66 and 68 enabling regulation of the flows delivered, respectively, to the condensation reactor 52 and to the partial recrystallization reactor 72. Thus, the crystals 77 formed during the partial recrystallization may be recycled immediately to form the primary solution, up to the depletion of these crystals 77.

The various reactors 52, 57, 72, the tank 46 of the evaporator, the heat exchangers 49, 81, the tank 36 for storing the deconcentrated solution and the various pipes which connect them together are at negative pressure under vacuum of intermediary gases, i.e. they are in communication (depending on the state of the controlled valves) to form the same closed chamber from which all the gases present before the facility is placed in service are evacuated by means of a vacuum pump (not shown).

In the embodiment of FIG. 3, the automatic machine 85 is also connected to the valve 68 so as to enable adjustment of the flow of liquid solution fed to the inlet of the partial recrystallization reactor 72, and to the valve 76 enabling adjustment of the flow of liquid solvent enabling cooling of the partial recrystallization reactor 72. The automatic machine 85 is also connected to the valves 69, 80 enabling the change of state of the heat pump from the state represented in FIG. 3 to the state represented in FIG. 4 and vice versa.

The various controlled valves may be, for example, optional rate electrovalves controlled by a programmed automatism notably as indicated above for performing the technical functions mentioned above, notably by means of suitable closed-loop servo controls or otherwise, using measurement sensors, notably temperature sensors and/or thermostats and/or sensors of liquid level in the tanks or reactors and/or sensors for detecting the presence of a solid composition in the reactors, or the like.

The invention may be subject to numerous variants and applications other than those described hereinabove. In particular, it goes without saying that, unless explicitly indicated otherwise, the various structural and/or functional features of each of the embodiments described hereinabove must not be considered as being combined and/or strictly linked to each other, but, on the contrary, as simple juxtapositions. In addition, the structural or functional features of the various embodiments described hereinabove may be subject totally or partly to any different juxtaposition or to any different combination.

For example, the adjustment of the mass flow of injected saline composition may be performed entirely manually by actuating the feed valve 67 of the solubilization reactor 57; the heat pump may be placed not at negative pressure under vacuum of intermediary gases, but at a higher pressure, containing a neutral gas such as air or the like, if this pressure is compatible with the evaporation phenomena involved, taking into account the thermal characteristics of the heat sources associated with the evaporators. In addition, the various condensation, solubilization, heat-exchange etc. devices may be subject to any number of structural variants and optimizations that are well known per se in chemical engineering, so as to exert their technical functions mentioned above.

The feed pipe of the solubilization reactor 57 may be connected not to the common pipe 61, but to the outlet of the cooling exchanger 81 so as to be fed with the cooled liquid solution. The corresponding valve 67 is then placed downstream of the cooling exchanger 81. Similarly, the feed pipe of the recrystallization reactor 72 may be connected not to the common pipe 61, but to the outlet of the cooling exchanger 81 so as to be fed with the cooled liquid solution. The corresponding valve 68 is then placed downstream of the cooling exchanger 81.

The invention claimed is:
1. A thermochemical heat pump comprising:
   a solvent evaporator, comprising:
   a tank of volatile liquid solvent,
   an evaporator exchanger, suitable for being thermally associated with a hot source, said evaporator exchanger comprising a circuit having a volatile liquid solvent inlet connected to the tank of volatile liquid solvent,
   a volatile solvent vapour outlet, said solvent evaporator being suitable for delivering a vapour of the volatile solvent vapour, vaporized under the effect of heat coming from said hot source,
   a reaction device comprising:
   a volatile solvent vapour inlet,
   at least one saline composition, containing at least one salt that is soluble in said volatile liquid solvent,
   at least one cooling exchanger, suitable for being thermally associated with a cold source, said volatile solvent vapour outlet from the solvent evaporator being connected to said volatile solvent vapour inlet of the reaction device, the reaction device being suitable for bringing about condensation of said volatile solvent vapour and absorption of said saline composition to form a liquid solution, with production of heat evacuated to the cold source via said cooling exchanger, wherein said reaction device further comprises:

at least one condensation reactor, comprising:

a liquid solution inlet connected to a cold liquid solution outlet of said cooling exchanger, a liquid solution outlet connected to a hot liquid solution inlet of said cooling exchanger, said condensation reactor being suitable for enabling contact of the vapour fed by said vapour inlet with a cold liquid solution delivered to said liquid solution inlet, so as to bring about condensation of said vapour and mixing of the volatile liquid solvent thus formed by condensation with said cold liquid solution, a hot liquid solution delivered to the liquid solution outlet of said condensation reactor resulting from this mixing, at least one injection of said saline composition between said liquid solution outlet and said liquid solution inlet of said condensation reactor, an adjustment device for adjusting a mass flow of each salt introduced into the liquid solution by means of at least one injection of said saline composition between said liquid solution outlet of said at least one condensation reactor and said liquid solution inlet of said condensation reactor.

2. The thermochemical heat pump according to claim 1, wherein the thermochemical heat pump further comprises, as a source of said saline composition, at least one solubilization reactor suitable for enabling the solubilization of at least one solid salt of said saline composition in an unsaturated liquid solution of said liquid solvent, said at least one solubilization reactor comprising at least one outlet delivering a flow of concentrated liquid solution forming said saline composition.

3. The thermochemical heat pump according to claim 2, wherein said injection of said saline composition is formed by an injection pipe connecting at least one outlet of at least one solubilization reactor to a common pipe, connected to said liquid solution outlet of said at least one condensation reactor.

4. The thermochemical heat pump according to claim 3, wherein said common pipe comprises a pump downstream of said injection of saline composition.

5. The thermochemical heat pump according to claim 4, wherein the feed pipe of the solubilization reactor is connected to the common pipe downstream of said pump.

6. The thermochemical heat pump according to claim 4, a recirculation pipe is connected to the common pipe downstream of said pump.

7. The thermochemical heat pump according to claim 3, wherein said at least one solubilization reactor comprises an unsaturated liquid solution inlet connected via a feed pipe to said common pipe, said feed pipe comprising a first controlled valve of said adjustment device for adjusting the flow of an unsaturated liquid solution delivered to an inlet of the solubilization reactor.

8. The thermochemical heat pump according to claim 7, wherein the pump comprises at least one temperature sensor for said cold liquid solution at the outlet of each cooling exchanger and in that the adjustment device is suitable for locking the flow delivered by the controlled valve of the feed pipe of said at least one solubilization reactor as a function of the temperature of said cold liquid solution measured by said at least one such temperature sensor.

9. The thermochemical heat pump according to claim 3, wherein the said common pipe is connected to the hot liquid solution inlet of each of said cooling exchanger via a recirculation pipe comprising a second controlled valve for adjusting the flow of hot liquid solution delivered to this cooling exchanger, and thus the flow of cold liquid solution delivered to the inlet of each of said condensation reactor connected to the liquid solution outlet of this cooling exchanger.

10. The thermochemical heat pump according to claim 1, wherein at least one injection of saline composition is connected to at least one outlet of said at least one condensation reactor.

11. The thermochemical heat pump according to claim 1, wherein each of said solvent evaporator, the reaction device, each first pipe in which vapour circulates, and each second pipe in which a liquid solution circulates, are at negative pressure under vacuum of intermediary gases.

12. The thermochemical heat pump according to claim 1, wherein said volatile liquid solvent is water and in that said saline composition comprises at least one salt chosen from the group formed from $ZnCl_2$, NaOH, LiBr, $ZnBr_2$, KOH, LiCl, $CaBr_2$, LiI, $CaCl_2$), $MgCl_2$, NaI, $Ca(NO_3)_2$, $Mg(NO_3)_2$, NaBr, $NH_4NO_3$, KI, $SrCl_2$, $NaNO_3$, NaCl, $KCH_3CO_2$, $K_2CO_3$, $MnCl_2$, $NaNO_2$.

13. A process for redistributing thermochemically stored heat energy, comprising:

evaporating a volatile liquid solvent, by heat exchange with a hot source, condensing said volatile solvent vapour and absorbing saline composition to form a liquid solution, with production of heat evacuated by heat exchange towards a cold source, wherein the reaction is performed in at least one condensation reactor, and comprises:

feeding a liquid solution inlet of the condensation reactor with a cold liquid solution coming from a cooling exchanger suitable for being thermally associated with said cold source, feeding the condensation reactor with a volatile solvent vapour resulting from said evaporation, feeding said cooling exchanger with a hot liquid solution delivered by a liquid solution outlet of the condensation reactor, contacting the vapour fed into the condensation reactor with the cold liquid solution fed into the condensation reactor, so as to bring about condensation of said vapour and mixing of the volatile liquid solvent thus formed by condensation with said cold liquid solution, the hot liquid solution delivered by the condensation reactor resulting from this mixing, injecting at least one saline composition between said liquid solution outlet and said liquid solution inlet of said at least one condensation reactor, adjusting a mass flow of each salt introduced into the liquid solution by injection of saline composition between said liquid solution outlet and said liquid solution inlet of at least one condensation reactor.

14. The process according to claim 13, wherein said adjustment comprises locking of the mass flow on at least one measured temperature, said temperature being measured by a sensor of the thermochemical heat pump.

15. The process according to claim 13, wherein said saline composition is formed by solubilization of at least one solid salt in a fraction of the flow of liquid solution comprising the liquid solution delivered by said at least one condensation reactor.

\* \* \* \* \*